United States Patent
Sella

(10) Patent No.: US 11,616,835 B2
(45) Date of Patent: Mar. 28, 2023

(54) EXTERNAL INJECTION OF CLOUD BASED NETWORK FUNCTIONS INTO NETWORK SERVICES

(71) Applicant: Level 3 Communications, LLC, Broomfield, CO (US)

(72) Inventor: William Sella, Parker, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 17/480,212

(22) Filed: Sep. 21, 2021

(65) Prior Publication Data

US 2022/0006861 A1    Jan. 6, 2022

Related U.S. Application Data

(63) Continuation of application No. 16/936,023, filed on Jul. 22, 2020, now Pat. No. 11,134,122, which is a continuation of application No. 16/443,030, filed on Jun. 17, 2019, now Pat. No. 10,728,327, which is a continuation of application No. 15/605,643, filed on (Continued)

(51) Int. Cl.
| | | |
|---|---|---|
| *H04L 67/133* | (2022.01) | |
| *H04L 67/1095* | (2022.01) | |
| *H04L 47/33* | (2022.01) | |
| *H04L 67/53* | (2022.01) | |
| *H04L 67/1001* | (2022.01) | |
| *H04L 47/24* | (2022.01) | |

(52) U.S. Cl.
CPC .......... *H04L 67/1095* (2013.01); *H04L 47/24* (2013.01); *H04L 47/33* (2013.01); *H04L 67/1001* (2022.05); *H04L 67/133* (2022.05); *H04L 67/53* (2022.05)

(58) Field of Classification Search
CPC ................. H04L 67/1095; H04L 67/53; H04L 67/1001; H04L 47/24; H04L 47/33; H04L 61/106
USPC .......................................................... 709/217
See application file for complete search history.

(56) References Cited

U.S. PATENT DOCUMENTS 8,782,744 B1 *  7/2014  Fuller .................. G06F 21/629
                                              709/225
8,832,321 B1     9/2014  Sella
(Continued)

FOREIGN PATENT DOCUMENTS

| CN | 1653790 A | 8/2005 |
| CN | 101411146 A | 4/2009 |
| JP | 2013225286 | 10/2013 |

OTHER PUBLICATIONS

Chinese Examination Report, dated Feb. 11, 2019, Application No. 201580008184.9, filed Feb. 9, 2015; 10 pgs.

(Continued)

*Primary Examiner* — Glenford J Madamba

(57) ABSTRACT

Disclosed herein are system, method, and computer program product embodiments for providing an API description of an external network service and using the API to integrate the external service into a network. An embodiment operates by receiving, from a service provider, a description of an application programming interface (API), transmitting a call to the service provider using the API for creating a new instance of a service and transmitting to the service provider a traffic flow upon which the service will be applied.

11 Claims, 5 Drawing Sheets

Related U.S. Application Data

May 25, 2017, now Pat. No. 10,326,839, which is a continuation of application No. 14/453,962, filed on Aug. 7, 2014, now Pat. No. 9,667,718, which is a continuation of application No. 14/178,389, filed on Feb. 12, 2014, now Pat. No. 8,832,321.

(56) References Cited

U.S. PATENT DOCUMENTS

| | | | |
|---|---|---|---|
| 9,015,730 | B1 | 4/2015 | Allen |
| 9,160,678 | B2 | 10/2015 | DeCusatis |
| 9,300,759 | B1 | 3/2016 | Jorgensen |
| 2003/0033519 | A1 | 2/2003 | Buckman et al. |
| 2003/0074463 | A1 | 4/2003 | Swartz et al. |
| 2003/0093537 | A1 | 5/2003 | Tremlett et al. |
| 2003/0126195 | A1 | 7/2003 | Reynolds et al. |
| 2005/0163131 | A1 | 7/2005 | Tonnby |
| 2007/0061431 | A1 | 3/2007 | Brunswig et al. |
| 2007/0124740 | A1* | 5/2007 | Brunswig ............... G06F 9/541 719/320 |
| 2007/0157167 | A1 | 7/2007 | Brendle et al. |
| 2012/0173612 | A1 | 7/2012 | Vegesna-Venkata |
| 2013/0005311 | A1 | 1/2013 | Lozinski et al. |
| 2014/0115325 | A1 | 4/2014 | Detienne |
| 2014/0233377 | A1 | 8/2014 | Szymanski |
| 2014/0237594 | A1 | 8/2014 | Thakadu |
| 2014/0310679 | A1 | 10/2014 | Bhattacharya |
| 2015/0036660 | A1 | 2/2015 | Bi |
| 2015/0169392 | A1 | 6/2015 | MacKay |
| 2015/0229719 | A1 | 8/2015 | Sella |
| 2016/0227045 | A1* | 8/2016 | Hunt ................. H04M 3/42297 |
| 2017/0264686 | A1 | 9/2017 | Sella |
| 2020/0351343 | A1 | 11/2020 | Sella |

OTHER PUBLICATIONS

European Examination Report, dated Jun. 22, 2016, Application No. 15154203.2, filed Feb. 6, 2015; 6 pgs.
Extended European Search Report, dated Apr. 29, 2015, Application No. 15154203.2, filed Feb. 6, 2015; 5 pgs.
International Preliminary Report on Patentability, dated Aug. 16, 2016, Int'l Appl. No. PCT/US15/015004, Int'l Filing Date Feb. 9, 2015; 7 pgs.
International Search Report, dated May 1, 2015, Int'l Appl. No. PCT/US15/15004, Int'l Filing Date Feb. 9, 2015; 3 pgs.
Japan Notification of Reasons for Refusal, dated Jan. 22, 2019, Application No. 2016-548360, filed Feb. 9, 2015; 5 pgs.
Written Opinion of the International Searching Authority, dated May 1, 2015, Int'l Appl. No. PCT/US15/15004, Int'l Filing Date Feb. 9, 2015; 5 pgs.
Dilip, Joseph et al., "A Policy-aware Switching Layer for Data Centers", *Computer Communication Review* vol. 38, No. 4 Oct. 1, 2008, pp. 51-62.
Gibb, Glen et al., "Outsourcing Network Functionality", *Hot Topics in Software Defined Networks* ACM, 2 Penn Plaza, Suite 701 New York NY 10121-0701 USA; DOI: 10.1145/2342441.2342457; ISBN: 978-1-4503-1477-0 Aug. 13, 2012, pp. 73-78.

* cited by examiner

EXTERNAL INJECTION OF CLOUD BASED NETWORK FUNCTIONS INTO NETWORK SERVICES

BACKGROUND

Technical Field

Embodiments generally relate to virtual network services and, in particular, to integrating external network functions into network services.

Background

Cloud-based network services can allow integration of various independently provided solutions into a virtual network in a manner that is transparent to service users. For example, a cloud based network service provided by one entity can incorporate a firewall service provided by a second entity, expanding the services available to the user as third parties make them available.

Generally, a network integrates externals services by adapting to an external service's application programming interface (API). A network can modify its operation to implement the API, instantiate the external service, and properly route traffic through the external service. However, modifying a network's operation to integrate to an API can require substantial time and effort.

SUMMARY

In view of the above, it would be advantageous to provide a mechanism for external network service providers to communicate an API description that can be incorporated into a network's operation to utilize the external service.

In an embodiment, a system receives, from a service provider, a description of an application programming interface (API). The system generates, based on a traffic flow, an API call to create a new instance of a service provided by the service provider, such that the call is formatted as specified by the description and transmits the API call to the service provider. The system transmits the traffic flow to the service provider and receives the traffic flow, wherein the service provider has applied the service to the traffic flow.

Method and computer-readable medium embodiments are also disclosed.

Further embodiments and features, as well as the structure and operation of the various embodiments, are described in detail below with reference to accompanying drawings.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for providing an API description of an external network service and using the API to integrate the external service into a network.

Figure 1A:
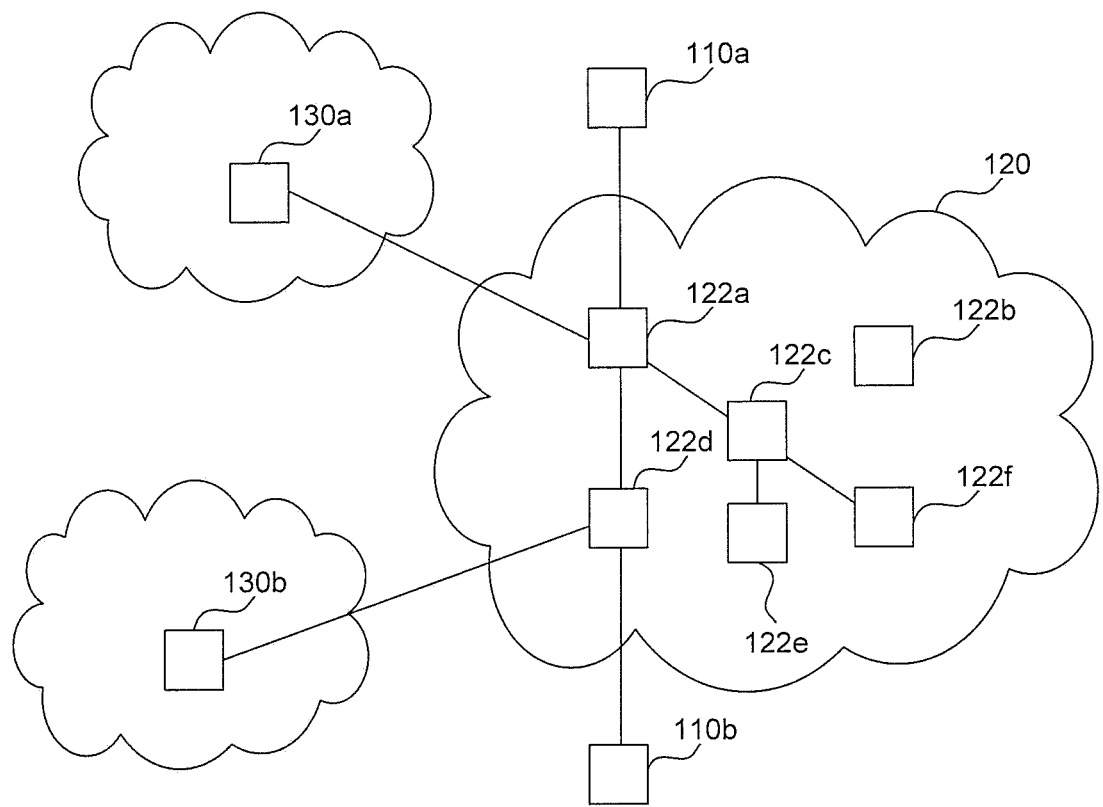
FIG. 1A is a block diagram of a networking environment for integrating cloud-based external services into a network, according to an example embodiment.

FIG. 1A illustrates a networking environment 100 for integrating cloud-based external services into a network, according to an example embodiment.

Networking environment 100 includes clients 110a and 110b, a network 120 and network service providers 130a-130b.

In an embodiment, clients 110a and 110b communicate through network 120. Each of clients 110a and 110b can be any computing device, or combination of computing devices, that can communicate through a network, such as, for example, personal computers, servers, mobile devices, local area networks (LANs), etc. Client 110a and 110b can be clients of network 120. In another embodiment, clients 110a and 110b communicate through a virtual LAN (VLAN) set up by network 120.

Network 120 includes a network of nodes 122a-f configured to route data traffic between clients, for example, clients 110a and 110b. For example, network 120 is a metropolitan area network (MAN) or a wide area network (WAN). In an embodiment, network 120 provides virtual networking services, such as, for example, VLANs, virtual private networks (VPNs), etc. In an embodiment, network 120 provides Ethernet connectivity between clients in remote locations. For example, network 120 provides a virtual circuit with dedicated bandwidth for data communications between clients in remote locations. Network 120 may utilize any point-to-point, point to multipoint, or multipoint-to-multipoint networking protocols. Network access protocols used may include, for example, Ethernet, Asynchronous Transfer Mode (ATM), High-Level Data Link Control (HDLC), Frame Relay, Synchronous Optical Networking (SONET)/Synchronous Digital Hierarchy (SDH), Internet Protocol (IP), Transmission Control Protocol (TCP), User Datagram Protocol (UDP), Multiprotocol Label Switching (MPLS), etc.

Network service providers 130a-130b provides network services independently from network 120. For example, providers 130a-b is a hosted by third-party entities. An example network service is a firewall that filters a traffic flow between two communicating clients. Other examples of network services are intrusion detection systems, antivirus systems, anti-spam filters, etc. In an embodiment, network service providers 130a-b provide network services to multiple networks. Network service providers 130a-b provides network services by providing an API for creating an instance of a network service and for formatting traffic to be serviced. Networks uses a provider's respective API to provision the provider's services.

In an embodiment, network 120 also provides clients with network services. For example, network 120 implements its own firewall service for its clients. In an embodiment, a client of network 120 can choose to use services provided by network 120 or external providers for additional or alternate services. In an embodiment, a client chooses the services and service sources through a client portal webpage.

According to an embodiment, network service providers 130a-b provides a description of the API to network 120 during a registration process. In this manner, providers 130 communicates to network 120 how to interact with and provision the services of provider 130. Network 120 then uses this API description to format a service request and traffic forwarding through the service providers. In this manner, network 120 provisions the services of multiple network service providers without having to modify its code for every provider. In an embodiment, providers 130a-b register their respective service APIs by calling a registration API of network 120 and including the provider API description as a parameter.

Figure 1B:
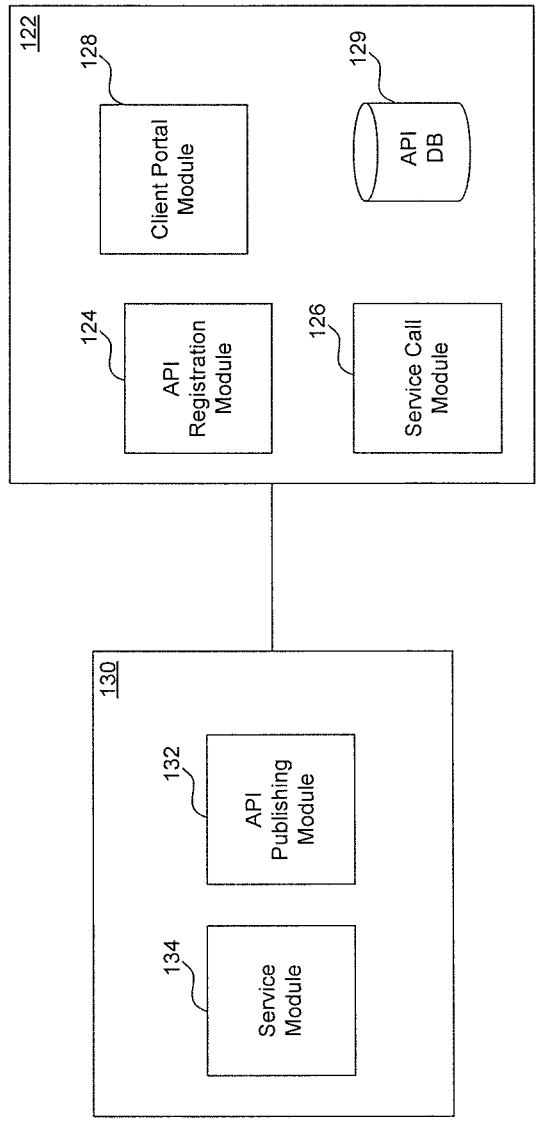
FIG. 1B is a block diagram illustrating further details of the networking environment for integrating cloud-based external service into a network, according to an example embodiment.

FIG. 1B is a block diagram illustrating further details of networking environment 100, according to an example embodiment.

As depicted in FIG. 1B, an exemplary network node 122 includes an API registration module 124, a service call module 126, a client portal module 128, and an API database 129.

In an embodiment, API registration module 124 receives API registration calls from network service providers. The API registration calls include an API description of the API call to provision a network service function provided by a service provider. API registration module 124 stores the API description in API database 129.

In an embodiment, service call module 126 generates and transmits API calls to provision a network service. When network 120 seeks to initiate an external network service from a service provider, service call module 126 queries API database 129 for the API description of the API call to initiate the service function.

In an embodiment, client portal module 128 receives commands from clients of network 120 to initiate external network services. For example, client portal module 128 may receive a command from client 110a to include firewall provided by firewall.com for the connection between client 110a and client 110b. In an embodiment, client portal module 128 provides a graphical user interface for clients to provision configuration and services settings. Client portal module 128 may then forward the instruction to service call module 126 to initiate the service. Client portal module 128 may provide a confirmation to the client that the external service has been properly initiated, or that the service is unavailable. For example, if no API for the service has been registered in API database 129, client portal module 128 may notify the client that the service requested is unavailable.

As depicted in FIG. 1B, an exemplary service provider 130 includes an API publishing module 132 and a service module 134.

In an embodiment, API publishing module 132 communicates a registration API call for registering a network service function with a network 120 that service provider 130 seeks to receive service requests from. In an embodiment, API publishing module 132 registers service APIs when a new service is provided, or when an API for an existing service has changed.

In an embodiment, service module 134 receives API service calls from networks, and initiates network service functions accordingly.

Figure 2:
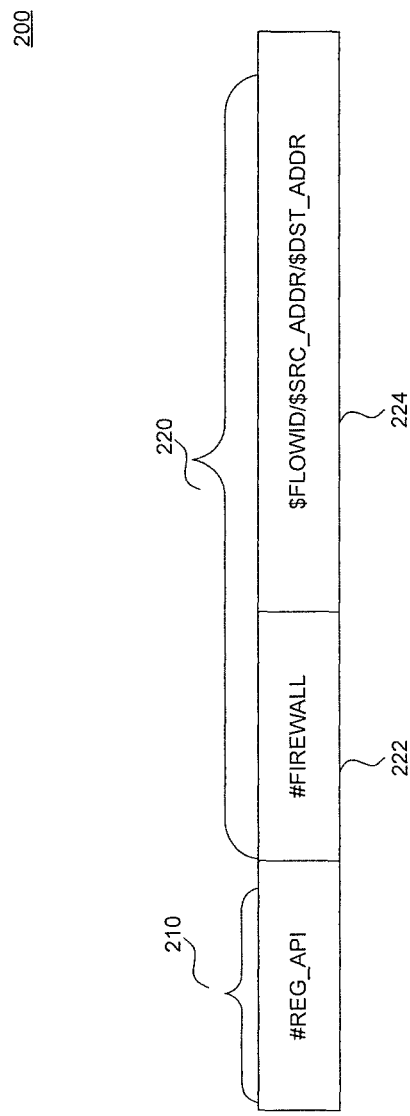
FIG. 2 is a block diagram illustrating an example registration API call for registering an network service API function with a network, according to an example embodiment.

FIG. 2 illustrates an example registration API call 200 for registering a network service API function 250 with network 120, according to an example embodiment. API calls between network 120 and network service providers 130 may be transmitted using, for example, Advance Message Queuing Protocol (AMQP), Simple Object Access Protocol (SOAP), Representational state transfer (REST), and Java Message Service (JMS).

In an embodiment, a registration API call 200 includes two parts: a registration API identifier 210 and an API description 220.

In an embodiment, registration API identifier 210 identifies API call 200 as a call to register an external function with network 120. Registration API identifier 210 may, for example, be a flag that differentiates API call 200 from other calls received by network 120.

In an embodiment, API description 220 specifies the format and parameters that are to be passed when calling external network API function 250. In an embodiment, API description 220 includes an external service identifier 222 and parameters 224.

Service identifier 222 identifies the external network API function 250 that is being registered. Service identifier 222 may be, for example, a number or a set of characters identifying API function 250.

Parameters 224 specify the parameters that network 120 needs to pass when provisioning the external API function. In an embodiment, parameters are specified from a list of parameters associated with a traffic flow that the external network API function 250 is applied to.

For example, network 120 may implement a VLAN between clients 110a and 110b, and may seek to establish a firewall for the traffic through the VLAN. In an example embodiment, network 120 calls an external API function 250 for the firewall, as described by a corresponding API description 220, to establish a firewall service provided by external provider 130a. As part of the API function call, network 120 may pass parameters such as, for example, an identifier of the traffic flow, the source and destination addresses of the traffic, the source and destination ports, etc.

In an embodiment, network 120 has a list of available parameters associated with traffic flows, and descriptors for these parameters. In an embodiment, a provider 130a registering an API function describes the API functions parameters 224 using descriptors from the list of available parameters associated with traffic flows in network 120. In an embodiment, API description 220 specifies the format of an API call with parameters represented as variables in appropriate locations. When forming an API call, network 120 replaces the variables with the corresponding parameters for the desired service.

Figure 3:
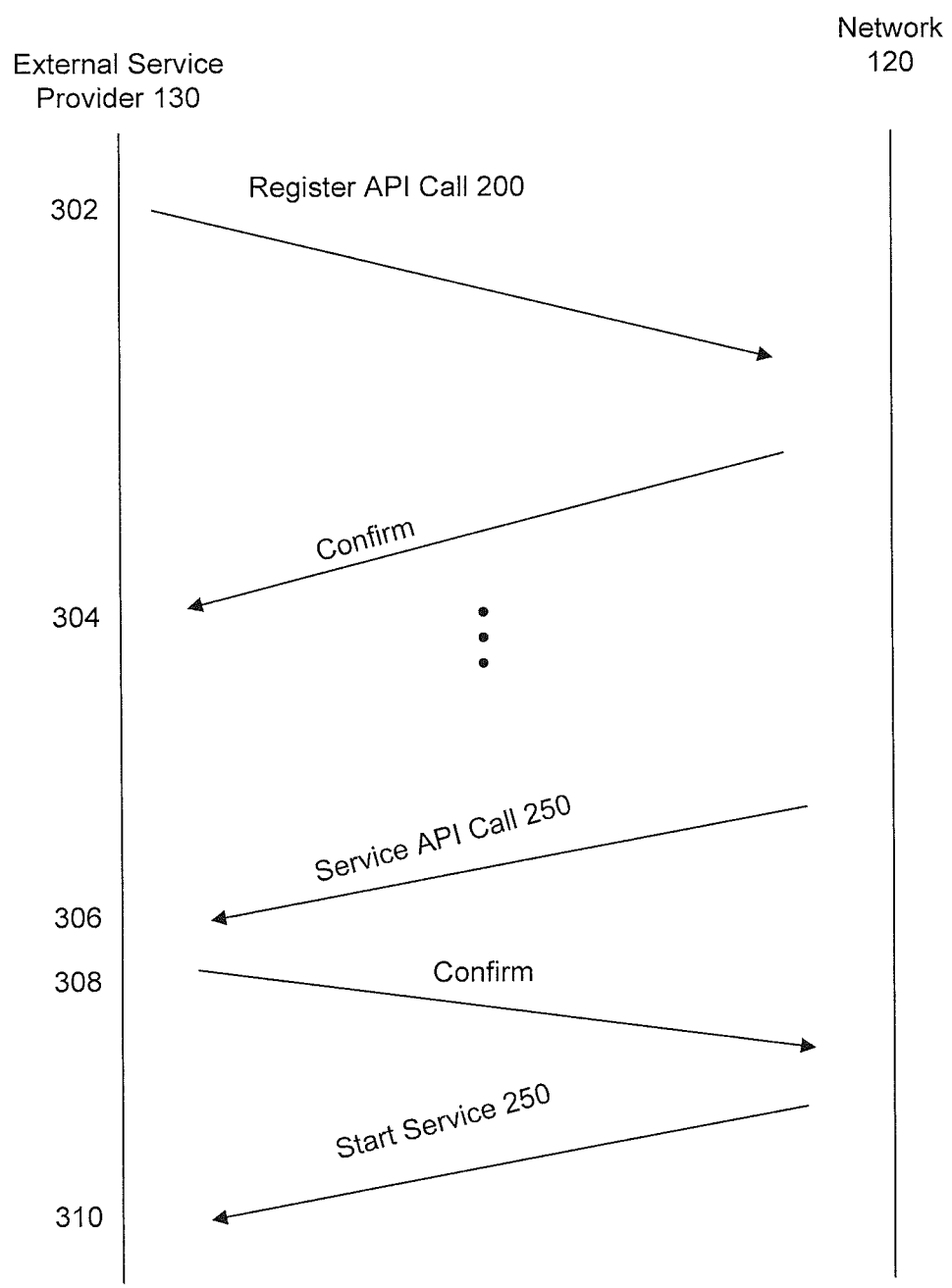
FIG. 3 is a diagram illustrating a sequence of calls for network API function registration and instantiation, according to an example embodiment.

FIG. 3 illustrates a sequence of calls for network API function registration and instantiation, according to an example embodiment.

As described above, service provider 130a registers an API function for a service provided. To register the API function so network 120 can call the function, a provider 130a places a registration API call to network service 120, as shown at step 302. Network 120 stores the received API description in an API registration database for future reference in initiating the external service function.

At step 304, network 120 may respond with a confirmation that the registration was successful.

At step 306, network 120 initiates the external service by retrieving the appropriate API description for the service from the API database and transmitting the API call to provider 130a.

At step 308, provider 130 sends a confirmation that the API call was successful.

At step 310, network 120 begins to send traffic through provider 130a to perform the provided service. For example, if a firewall service is initiated through an API call, network 120 sends traffic through provider 130 for processing.

If the format for an API call changes, an external service provider updates the API description by, for example, performing process 300 again.

Figure 4:
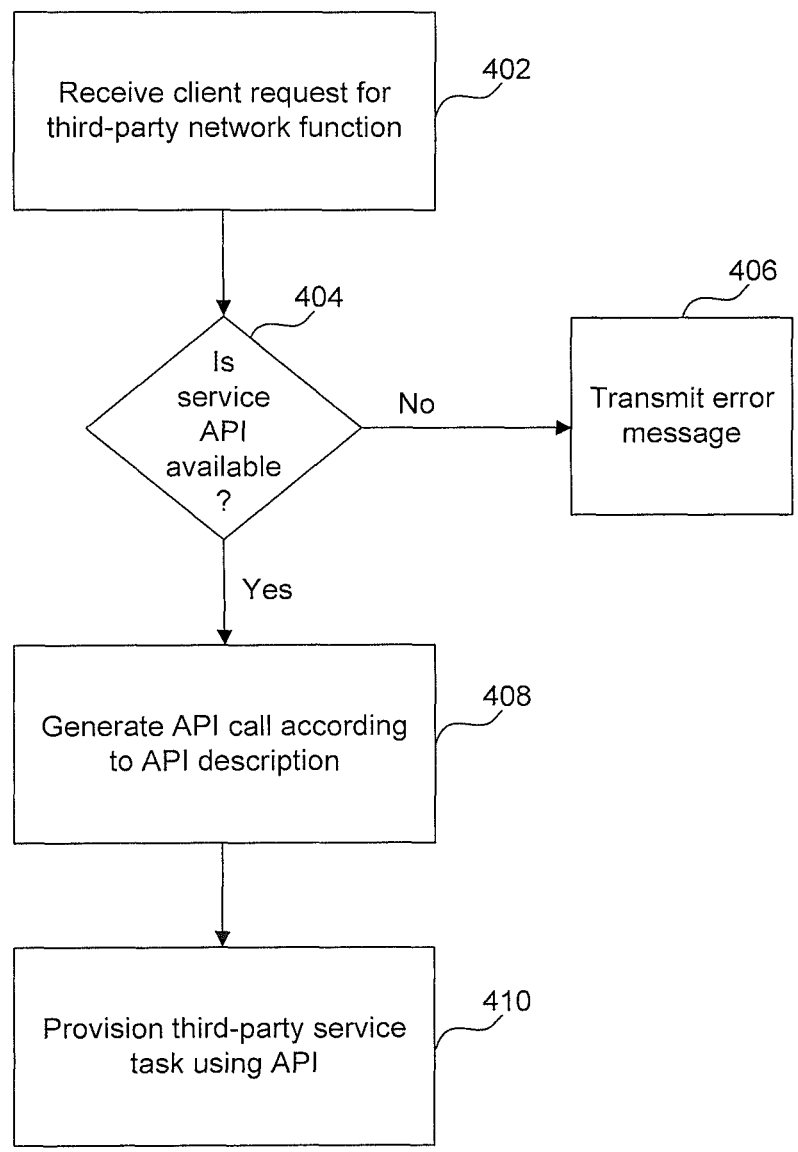
FIG. 4 is a flowchart describing a process for initiating an external service in a network service, according to an example embodiment.

FIG. 4 is a flowchart describing a process for initiating an external service in a network service, according to an example embodiment.

At step 402, network 120 receives a request from a client to incorporate an external service into a traffic flow. For example, client 110a may want to add a firewall provided by firewall.com to a VLAN connection between client 110a and client 110b.

At step 404, network 120 checks whether the requested external service has been registered. In an embodiment, network 120 checks the API registration database and tries to retrieve a description of the API corresponding to the requested external service. If network 120 does not find an API description for the service, network 120 does not create the service instance and notifies the requesting client with an error message, as shown in step 406.

If at step 404, network 120 finds an API description corresponding to the requested service, the process moves to step 408 and creates an API call in the format described by the API description. For example, network 120 may prepare an API call to create a firewall in a format specified by firewall.com. The API call include parameters in the place of variables specified in the description. For example, an API description for creating a firewall using firewall.com may be "#fw/$FLOW_ID/$SRC_ADDR/$DST_ADDR/$SRC_PORT/$DST_PORT." An API call to establish a firewall between two clients would then substitute the variables for the corresponding parameters of the traffic flow, for example: "#fw/60/110.20.30.1/110.20.42.1/88/89."

At step 410, network 120 transmits the API call to the external service and initiate the service by forwarding traffic in the appropriate format. In the above example, network 120 would transmit the API call as described above, and then forward flow 60 traffic coming from node 110.20.30.1:88 and directed to 110.20.42.1:89 and divert it through the firewall.com network.

CONCLUSION

API database may be any stored type of structured memory, including a persistent memory. In examples, each database may be implemented as a relational database or file system.

Each of the blocks and modules in FIGS. 1A and 1B may be implemented in hardware, software, firmware, or any combination thereof.

Each of the blocks and modules in FIGS. 1A and 1B may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, memory, and graphical user interface display. The computing device may also have multiple processors and multiple shared or separate memory components. For example, the computing device may be a part of or the entirety of a clustered computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described examples, but should be defined only in accordance with the following claims and their equivalents.

What is claimed is:

1. A method for integrating external services into a first network, comprising:

receiving, at a network element, a traffic flow addressed to a destination;

receiving, at the network element, a description of an application programming interface (API) call from a service provider, wherein the description includes the parameters and specifies a format for the API call;

generating the API call including parameters to be passed to the service provider, wherein the generating the API call comprises:

based on the traffic flow, generating variables corresponding to the parameters specified by the description of the API call; and substituting the variables for the corresponding parameters;

transmitting the message call to the service provider to initiate a service;

prior to transmission of the traffic flow to the destination, transmitting, to the service provider, the traffic flow to be processed by the initiated service; and after the traffic flow is processed by the initiated service, receiving, from the service provider, the traffic flow to forward on to the destination.

2. The method of claim 1, wherein transmitting the message call comprises transmitting the message call according to the format.

3. The method of claim 1, wherein the network element resides in a first network, and the service provider processes a second traffic flow from a second network element residing in a second network independent from the first network.

4. The method of claim 1, wherein the message call is transmitted to the service provider using at least one of Advance Message Queuing Protocol (AMQP), Simple Object Access Protocol (SOAP), Representational state transfer (REST), and Java Message Service (JMS).

5. A non-transitory computer-readable device having instructions stored thereon that, when executed by at least one computing device, causes the at least one computing device to perform operations comprising:

receiving, at a network element, a traffic flow addressed to a destination;

receiving, at the network element, a description of an application programming interface (API) call from a service provider, wherein the description includes the parameters and specifies a format for the API call;

generating the API call including parameters to be passed to the service provider, wherein the generating the API call comprises:

based on the traffic flow, generating variables corresponding to the parameters specified by the description of the API call; and substituting the variables for the corresponding parameters;

transmitting the message call to the service provider to initiate a service;

prior to transmission of the traffic flow to the destination, transmitting, to the service provider, the traffic flow to be processed by the initiated service; and after the traffic flow is processed by the initiated service, receiving, from the service provider, the traffic flow to forward on to the destination.

6. The non-transitory computer-readable device of claim 5, wherein transmitting the message call comprises transmitting the message call according to the format.

7. The non-transitory computer-readable device of claim 5, wherein the network element resides in a first network, and the service provider processes a second traffic flow from a second network element residing in a second network independent from the first network.

8. The non-transitory computer-readable device of claim 5, wherein the message call is transmitted to the service provider using at least one of Advance Message Queuing Protocol (AMQP), Simple Object Access Protocol (SOAP), Representational state transfer (REST), and Java Message Service (JMS).

9. A system comprising a memory and one or more processors coupled to the memory, the one or more processors configured to:

receive, at a network element, a traffic flow addressed to a destination;

receive, at the network element, a description of an application programming interface (API) call from a service provider, wherein the description includes the parameters and specifies a format for the API call;

generate the API call including parameters to be passed to the service provider, wherein the generating the API call comprises:

based on the traffic flow, generating variables corresponding to the parameters specified by the description of the API call; and substituting the variables for the corresponding parameters;

transmit the message call to the service provider to initiate a service;

prior to transmission of the traffic flow to the destination, transmit, to the service provider, the traffic flow to be processed by the initiated service; and after the traffic flow is processed by the initiated service, receive, from the service provider, the traffic flow to forward on to the destination.

10. The system of claim 9, wherein the one or more processors are configured to transmit the message call according to the format.

11. The system of claim 9, wherein the system resides in a first network, and the service provider processes a second traffic flow from a second network element residing in a second network independent from the first network.

\* \* \* \* \*